United States Patent
Pays et al.

(10) Patent No.: US 10,518,326 B2
(45) Date of Patent: Dec. 31, 2019

(54) METHOD FOR THE POWDER-BASED ADDITIVE MANUFACTURING OF A PART, NOTABLY A LINING BLADE FOR A TIRE MOULD, WITH AN ASSOCIATED REINFORCING ELEMENT

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Pierre Pays, Clermont-Ferrand (FR); Bruno Nigaize, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 310 days.

(21) Appl. No.: 15/329,709

(22) PCT Filed: Jul. 24, 2015

(86) PCT No.: PCT/EP2015/067043
§ 371 (c)(1),
(2) Date: Jan. 27, 2017

(87) PCT Pub. No.: WO2016/016138
PCT Pub. Date: Feb. 4, 2016

(65) Prior Publication Data
US 2017/0203365 A1    Jul. 20, 2017

(30) Foreign Application Priority Data
Jul. 28, 2014  (FR) ..................... 14 57260

(51) Int. Cl.
*B22F 3/105* (2006.01)
*B33Y 80/00* (2015.01)
(Continued)

(52) U.S. Cl.
CPC ........ *B22F 3/1055* (2013.01); *B23K 15/0086* (2013.01); *B23K 26/342* (2015.10);
(Continued)

(58) Field of Classification Search
CPC ......... B33Y 10/00; B22F 3/1055; B22F 10/00
(Continued)

(56) References Cited

U.S. PATENT DOCUMENTS

2002/0139164 A1  10/2002  Ishihara
2004/0031780 A1  2/2004  Hagemeister et al.
(Continued)

FOREIGN PATENT DOCUMENTS

EP    075743    2/1997
EP    2022622   2/2009
(Continued)

*Primary Examiner* — Weiping Zhu
(74) *Attorney, Agent, or Firm* — Cozen O'Connor

(57) ABSTRACT

Process for the additive manufacturing of at least one part by powder sintering or melting using at least one beam of energy. A step of deposition and selective melting of stacked layers of powder manufactures at least one intermediate element comprising the part and at least one local reinforcing element having a split tubular shape that surrounds one of the lateral end faces of the part and that face each of the frontal faces of said part adjacent to said end face, said reinforcing element extending in a direction substantially parallel to the stacking direction of the layers. The part and the local reinforcing element are separated.

10 Claims, 5 Drawing Sheets

(51) Int. Cl.
  *B33Y 10/00*   (2015.01)
  *B33Y 40/00*   (2015.01)
  *B23K 26/342*  (2014.01)
  *B23K 15/00*   (2006.01)
  *B28B 1/00*    (2006.01)
  *B22F 3/10*    (2006.01)

(52) U.S. Cl.
  CPC .............. *B28B 1/001* (2013.01); *B33Y 10/00* (2014.12); *B33Y 40/00* (2014.12); *B33Y 80/00* (2014.12); *B22F 2003/1046* (2013.01); *B22F 2003/1058* (2013.01); *B22F 2998/10* (2013.01)

(58) Field of Classification Search
  USPC .......................................................... 419/53
  See application file for complete search history.

(56) References Cited

U.S. PATENT DOCUMENTS

2009/0039570 A1*  2/2009  Clark .................... B22F 3/1055
                                                      264/653
2012/0178845 A1   7/2012  Napadensky et al.

FOREIGN PATENT DOCUMENTS

FR     2974316     2/1951
FR     2961741     12/2011

* cited by examiner

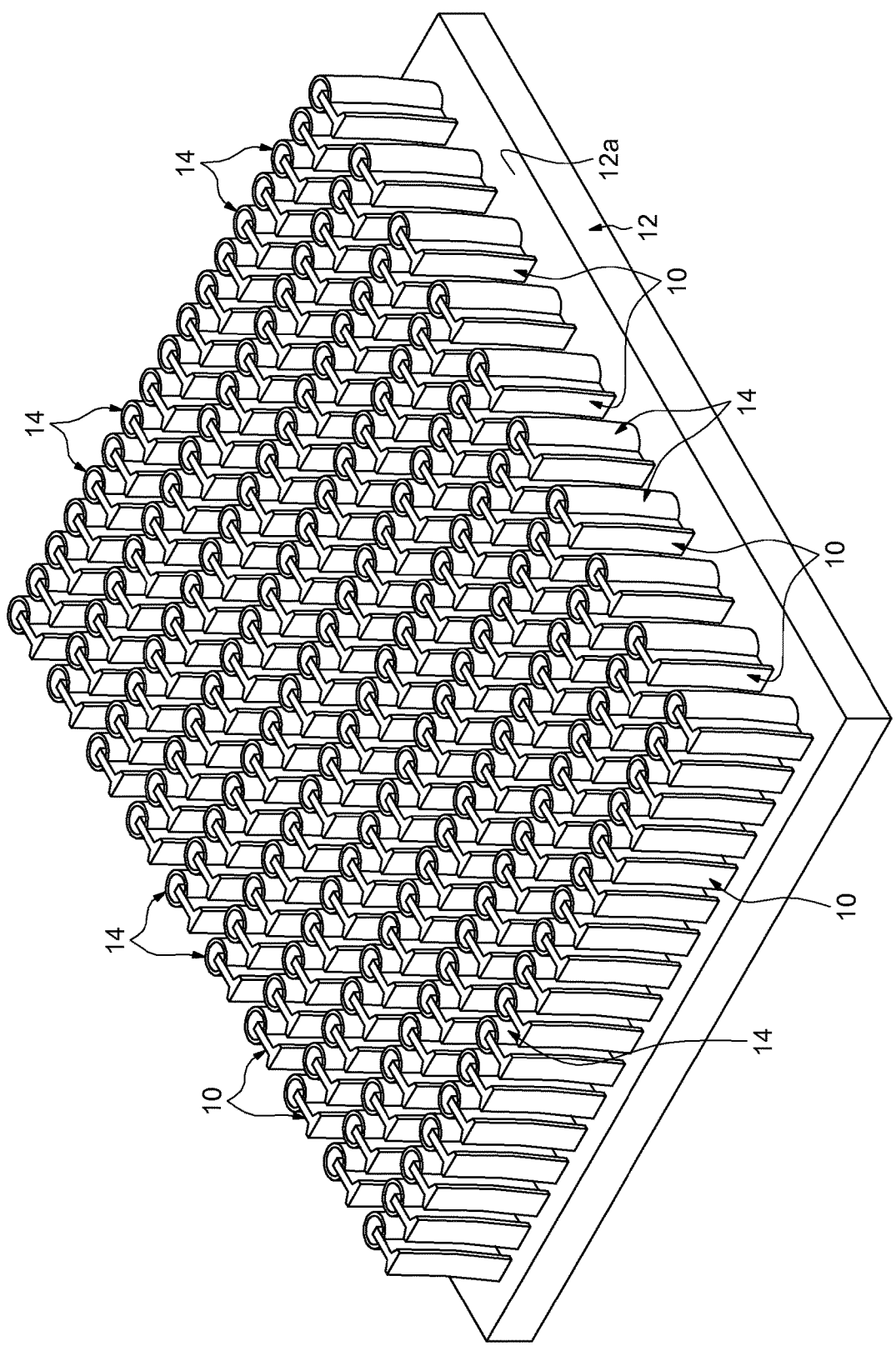

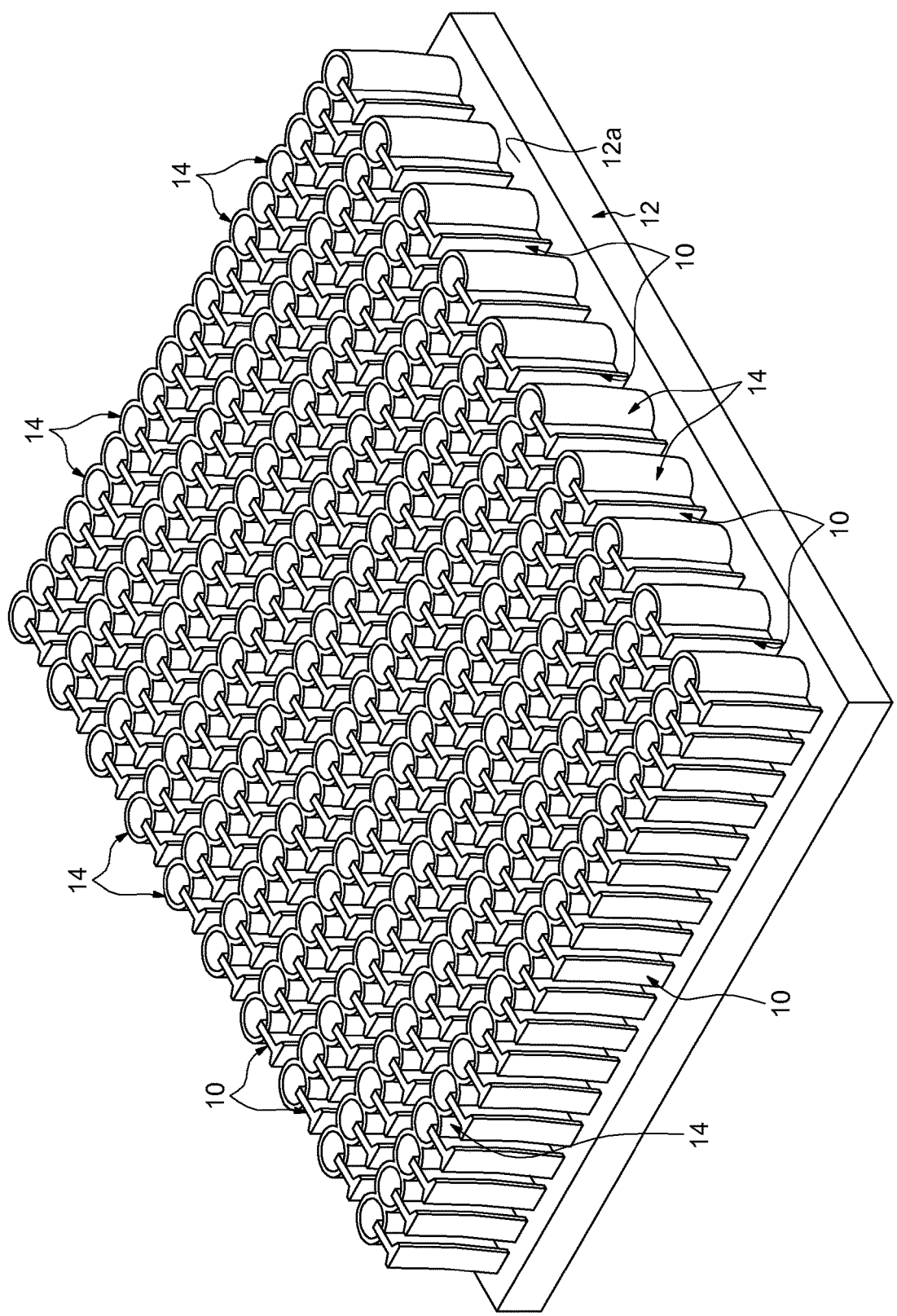

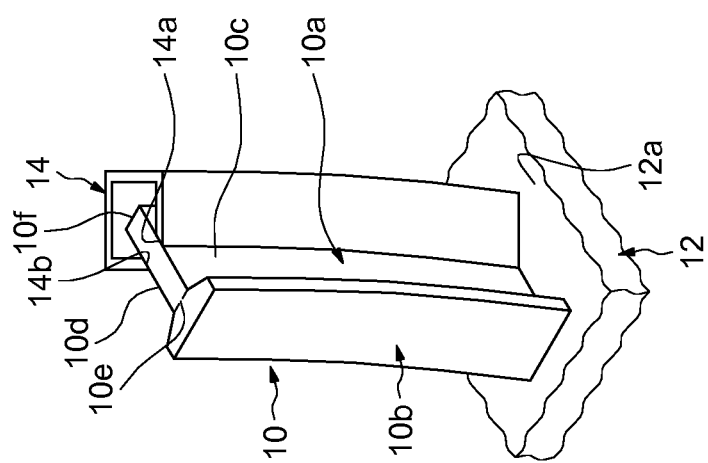
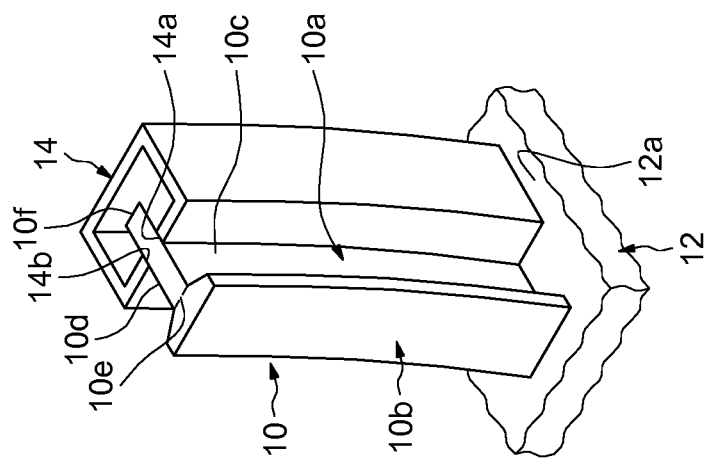
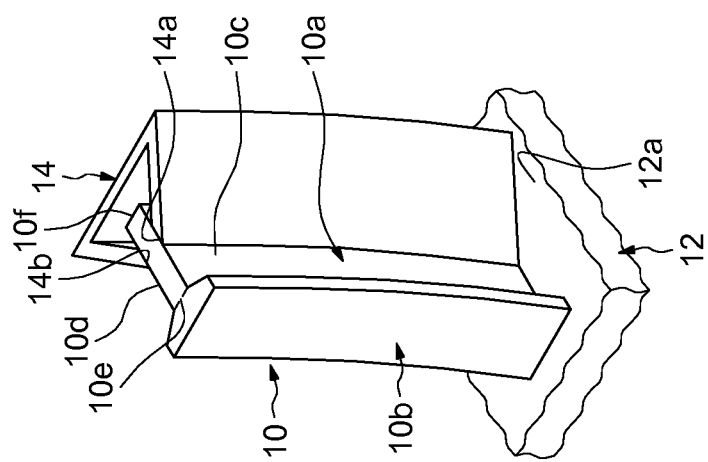

METHOD FOR THE POWDER-BASED ADDITIVE MANUFACTURING OF A PART, NOTABLY A LINING BLADE FOR A TIRE MOULD, WITH AN ASSOCIATED REINFORCING ELEMENT

RELATED APPLICATIONS

This is a U.S. National Phase Application under 35 USC 371 of International Application PCT/EP2015/067043 filed on Jul. 24, 2015.

This application claims the priority of French application no. 1457260 filed Jul. 28, 2014, the entire content of which is hereby incorporated by reference.

FIELD OF THE INVENTION

The present invention relates to a process for powder-based additive manufacturing by sintering or melting grains of said powder using a beam of energy. A "beam of energy" means electromagnetic radiation (for example a laser beam) or a beam of particles (for example an electron beam).

BACKGROUND OF THE INVENTION

One particularly advantageous application of the invention relates to the manufacture of lining elements, such as blades, of a sectored-type curing or vulcanizing mould for vehicle tires.

This type of mould mainly comprises two shells that each mould one of the lateral sidewalls of the tire, a plurality of sectors that mould the tread of said tire and are radially movable between an open position and a closed position of the mould. The shells and the sectors define an inner space that is intended to be brought into contact with the unvulcanized green form of the tire. In order to form the tread patterns, blades are attached to the sectors of the mould and protude into this inner space. For further details on a mould comprising such blades, reference could for example be made to documents EP-B1-1 758 743 and US-A1-2002/0139164.

The advantage of manufacturing by selective melting of superposed layers of powder, more commonly referred to as sintering, mainly lies in the fact that the shape of these blades may be modelled by a computer and that the blades may then be manufactured on the basis of this modelling by computer control of the beam of energy. In addition, this technique is highly suitable for the manufacture of elements of small sizes and of complex shapes, such as mould lining blades, which are difficult to manufacture with other processes.

When the selective melting is carried out by a laser beam, it is referred to as laser sintering. The laser sintering technique consists in manufacturing the blade layer after layer, by stacking the layers of powder, which are consolidated and fused on top of one another by the laser beam, in a stacking direction. The term "powder" is understood to mean a powder or a mixture of powders. The powder may for example be metallic or mineral, for example ceramic.

Conventionally, in order to ensure the preparation of the bed of powder prior to the sintering or melting operation, a layering device is used. Such a device mainly comprises a cylinder or roller capable of distributing the powder as a layer on a manufacturing plate. For more details, reference may be made for example to the patent application FR-A1-2 974 316.

The first layer is deposited then welded directly to the manufacturing plate. The other layers are then formed successively so as to obtain a stack starting from the first layer.

Once the blade is formed, it is necessary to detach it from the manufacturing plate, for example by cutting by electro-erosion by wire. This detachment may lead to a deformation of the blade in so far as the existing mechanical stresses between the various stacked layers may be modified.

In order to overcome this drawback, patent application FR-A1-2 961 741 recommends providing overthicknesses formed integrally with the blade and that form reinforcers. This solution is effective for guaranteeing that the blades retain their shape after detachment from the manufacturing plate on which they were manufactured.

However, even with such reinforcers, under the effect of the forces applied by the layering device on each pass over the powder layers, vibrations, deformations and/or deteriorations of the blades in the process of being manufactured may occur, which may give rise to the appearance of stress concentrations and microcracks. This is especially the case for the blades having a relatively small cross section.

SUMMARY OF THE INVENTION

Furthermore, concentrations of internal stresses are generated in the blades by heat diffusion during the melting steps. This also generates deformations and/or deteriorations of the blades in the process of being manufactured.

The present invention aims to overcome these drawbacks.

More particularly, one object the present invention is to provide a process for the additive manufacturing of at least one part by powder sintering or melting using at least one beam of energy which makes it possible to limit the risk of vibrations, deformations and/or deteriorations of the blades during manufacture.

In one embodiment, the process for the additive manufacturing of at least one part by powder sintering or melting using at least one beam of energy, said part comprising at least two opposite main faces and at least two ends, comprises the following steps:

a) manufacture, by deposition and selective melting of stacked layers of powder, of at least one intermediate element comprising the part and at least one local reinforcing element having a split tubular shape that surrounds one of the lateral end faces of the part and that comes to face each of the frontal faces of said part adjacent to said end face, said reinforcing element extending in a direction substantially parallel to the stacking direction of the layers, and b) separation of the part and of the local reinforcing element.

The provision of at least one local reinforcing element associated with the part in order to form an intermediate element makes it possible to hold the part during the process in position and to make it stiffer. Thus, the risk of vibrations and of deformations of the part, in particular by bending, during the passage of the layering device over each of the pre-fused powder layers, and also during the steps of melting the successive layers, is limited.

In one preferred embodiment, the fused powder layers of the part and of said local reinforcing element are joined to one another during the manufacturing step. This further favours a good hold of the part during the manufacture.

Preferably, said local reinforcing element is configured so as to reinforce the part at least in a direction substantially perpendicular to the stacking direction of the layers. This configuration is advantageous in so far as the risk of deformations of the blade under the effect of the forces applied by the layering device is further reduced. This also makes it possible to limit the deformations linked to the internal concentrations generated in the part by heat diffusion during the melting steps.

In one embodiment, unfused powder fills a space that exists between an inner surface of said local reinforcing element and the part before the separation step. The unsintered powder is thus compacted between the inside of the local reinforcing and the part, which further increases the stiffness of the intermediate element.

Preferably, according to a modelled melting of a layer of powder of the local reinforcing element and of a layer of powder of the part, a gap is provided between each end face of the layer of the reinforcing element and the frontal face of the layer of the part which is facing said end face. The gap is between 0.01 mm and 1 mm, and preferably between 0.05 and 0.2 mm, and preferably less than or equal to 0.1 mm.

Said local reinforcing element may extend over the entire height of the part.

In one embodiment, a plurality of intermediate elements is manufactured simultaneously at least as a matrix of columns and rows. Advantageously, the reinforcing elements of at least one column or of at least one row are produced as one piece. Thus the stiffening effect of the reinforcing elements of the column in question is increased and the handling of these assembled intermediate elements is facilitated.

One aspect of the invention relates to an intermediate element obtained by implementation of the process as defined above.

BRIEF DESCRIPTION OF THE DRAWINGS

The present invention will be understood better from reading the detailed description of embodiments considered by way of entirely non-limiting examples and illustrated by the appended drawings, in which:

FIG. 1 is a schematic perspective view partially illustrating a process for manufacturing blades according to a first example of implementation, FIG. 5 is a schematic perspective view partially illustrating a process for manufacturing blades according to a second example of implementation, FIGS. 7 to 9 are perspective views of an intermediate element obtained during fourth, fifth and sixth examples of implementation of the manufacturing process.

DETAILED DESCRIPTION OF THE DRAWINGS

Figure 3:
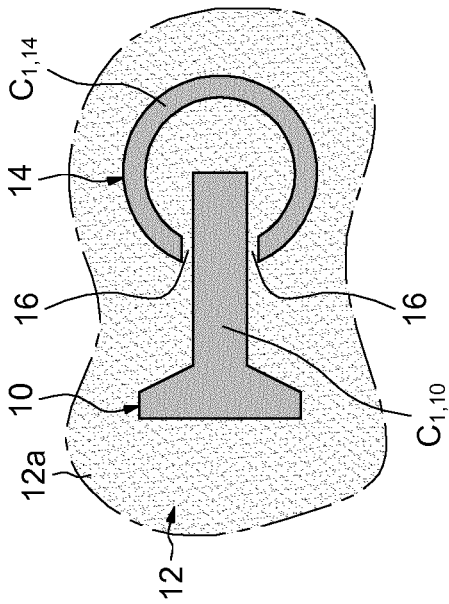
FIG. 3 is a schematic top view illustrating layers of the intermediate element of FIG. 2 after selective melting modelled by a computer.

Represented in FIG. 1 is an arrangement of identical blades 10 which are intended for a tire vulcanizing mould and are formed on a manufacturing plate 12 represented in an assumed horizontal position. Each blade 10 is associated with a local reinforcing element 14 surrounding only one of the ends of said blade. The reinforcing elements 14 are identical to one another. The plate 12 comprises an upper surface forming a working surface 12a on which the blades 10 and the reinforcing elements 14 are formed. The blades 10 and the reinforcing elements 14 are respectively identical to one another.

Figure 2:
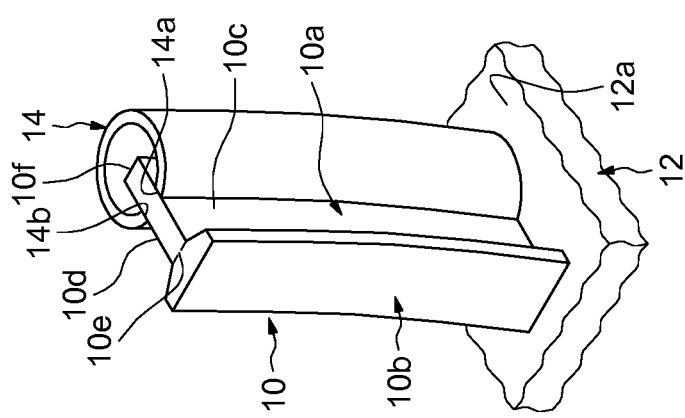
FIG. 2 is a perspective view of an intermediate element obtained during the manufacturing process of FIG. 1 and that comprises one of the blades and a local reinforcing element.

As illustrated more clearly in FIG. 2, each blade 10 has a rectangular general shape. The length of the blade extends substantially perpendicular relative to the working surface 12a of the manufacturing plate, i.e. here substantially vertically. The blades 10 are oriented or extend substantially vertically. In other words, the length of the blade constitutes its height.

The blade 10 here has a curved shape. In the embodiment illustrated, each blade 10 comprises a main body 10a and a head 10b made in one piece with said body. The body 10a comprises two opposite main frontal faces 10c, 10d and two opposite lateral end faces 10e, 10f delimiting said frontal faces. The main frontal faces 10c, 10d delimit the thickness of the body 10a of the blade. In the exemplary embodiment illustrated, the main faces 10c, 10d are flat. As variants, these faces could have another shape, for example a wavy shape. The head 10b prolongs the end face 10e of the body and extends parallel to the length of the body. The head 10b here has a substantially cylindrical shape with a triangular cross section. As a variant, the cross section of the head could have any other shape, for example rectangular, square, circular, etc., or else V-shaped or U-shaped. The blade 10 is capable of enabling the moulding of a water drop pattern in the tread of the tire Each reinforcing element 14 surrounds the end face 10f of the associated blade and faces the frontal faces 10c, 10d. Each reinforcing element 14 comprises two end faces 14a, 14b that face the frontal faces 10c, 10d of the blade. The reinforcing element 14 has a split tubular shape. A portion of the blade 10 extends inside the reinforcing element 14 through the slit delimited by the end faces 14a and 14b, the other portion of the blade being located outside of said reinforcing element. Each reinforcing element 14 extends substantially perpendicular relative to the working surface 12a of the manufacturing plate. Each reinforcing element 14 here has a length substantially equal to that of the associated blade 10.

The following procedure is used for the manufacture of the plurality of blades 10. In a first step, a first layer of powder is deposited on the working surface 12a of the manufacturing plate. After deposition, the first layer extends substantially horizontally over the working surface 12a. The powder may for example be metallic or mineral, for example ceramic.

In a second step, an energy source (not represented), for example of laser type, emits a laser beam, the orientation of which is controlled by galvanometric mirrors (not represented). An optical lens (not represented) makes it possible to focus the laser beam in order to heat the layer of powder in a pattern corresponding to the cross section of the blade 10 to be manufactured and to the cross section of the associated reinforcing element 14, and thus to selectively carry out the melting of the powder. This selective melting is carried out in each zone of the working surface 12a of the manufacturing plate on which a blade 10 and the associated reinforcing element 14 should be manufactured.

As illustrated in FIG. 3, the control of the laser beam is modelled by a computer so as to theoretically obtain, on the working surface 12a of the manufacturing plate, a first fused powder layer $C_{1,10}$ and a first fused power layer $C_{1,14}$ respectively for the formation of the blade 10 and of the associated reinforcing element 14. In this figure, the powder deposited previously and not sintered is illustrated by dots. As modelled, a gap 16 is provided between each end face of the fused powder layer $C_{1,14}$ of the reinforcing element and the frontal face of the fused power layer $C_{1,10}$ of the blade. This gap is between 0.01 mm and 1 mm, and advantageously between 0.05 and 0.2 mm, and preferably less than or equal to 0.1 mm.

Figure 4:
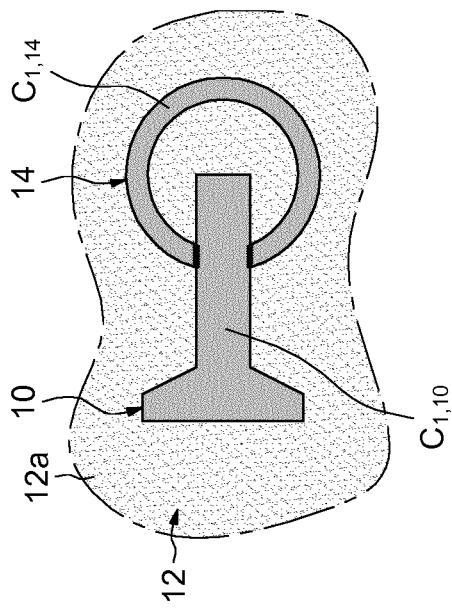
FIG. 4 is a schematic top view illustrating layers of the intermediate element of FIG. 2 after selective laser melting.

In practice, with a theoretical gap 16 of less than or equal to 0.1 mm, under the effect of the sintering of the first fused powder layers $C_{1,10}$ and $C_{1,14}$, the deposited powder present between each end face of the layer $C_{1,10}$ and the frontal face of the layer $C_{1,14}$ is completely or partly fused by diffusion of the heat joining said layers of the blade 10 and of the reinforcing element 14 being formed. The attachment that exists between these layers is illustrated schematically in FIG. 4. This attachment creates a link between the blade 10 and the reinforcing element 14 which may be broken manually, as specified subsequently. A base player of the fused powder layers refers to the lower layer $C_{1,10}$, $C_{1,14}$ on which, respectively, the blade 10 and the reinforcing element 14 rest.

During a third step, after the laser treatment step, a second layer is deposited on the first powder layer which is partly fused. Next, the selective melting of the second layer is carried out as before. These steps are repeated again in order to form, by stacking of fused layers, the blades 10 and the associated reinforcing elements 14. The fused layers of each blade 10 and of each reinforcer 14 extend substantially horizontally and are stacked on top of one another in a substantially vertical stacking direction. Each reinforcing element 14 makes it possible to reinforce the associated blade 10 at least in a direction substantially perpendicular to the stacking direction of the layers.

Thus, a plurality of intermediate elements, each comprising the blade 10 and the associated local reinforcing element 14, is manufactured. In the exemplary embodiment illustrated, for each intermediate element manufactured, the blade 10 and the reinforcing element 14 are produced as one piece. The reinforcing element 14 that surrounds the end face 10f of the blade and bears on either side against the main faces 10c, 10d of this end face makes it possible to ensure that said blade in the process of being manufactured is held in position. This further limits the risk of deformations, in particular by bending during the passage of the layering device and by diffusion of the heat during the melting steps, which may give rise to the appearance of stress concentration and microcrack phenomena. Moreover, the presence of unsintered powder, trapped and compacted in the space that exists between the blade 10 and the bore of the reinforcing element 14 forming an inner surface further promotes a good holding of the blade. The reinforcing element 14 only bears against the main faces 10c, 10d of the blade 10 and not against the end face 10f.

As illustrated in FIG. 1, after manufacture, the intermediate elements each constituted by a blade 10 and the associated reinforcing element 14 are arranged on the plate 12 as a matrix of parallel columns and rows. The intermediate elements may then be detached from the manufacturing plate 12, for example by cutting by electro-erosion by wire. Finally, during a last step, the blades 10 and the reinforcing element 14 of each intermediate element are detached from one another by pulling, which may for example be manual, so as to keep only the blades. The tensile force exerted in order to carry out this detachment is oriented perpendicular to the stacking direction of the powder layers. Moreover, the portion of the blade 12 protruding outside of the reinforcing element 14 facilitates the gripping for carrying out this detachment.

In the exemplary embodiment illustrated, the intermediate elements of each column are manufactured so as to be aligned and spaced out relative to one another. As a variant, it is possible to make provision for the manufacture of the intermediate elements so that the reinforcing elements 14 of each column are produced as one piece, as illustrated in the embodiment variant from FIG. 5 in which identical elements bear the same references. This makes it possible to further increase the stiffness of the assembly thus obtained and to limit the risk of deformations of the blades 10 of this assembly. This also facilitates the handling of the assembly after cutting. In addition, after cutting of the intermediate elements from the manufacturing plate 12, the blades 10 of a same column may then be detached from their reinforcing elements 14 in a single operation.

In the preceding exemplary embodiments, the blades 10 have a general rectangular shape and are designed to enable the moulding of a water drop type pattern. Since the cross section of the head 10b of each blade is relatively large, this head has a sufficient stiffness not to require the provision of a local reinforcer in this zone.

Figure 6:
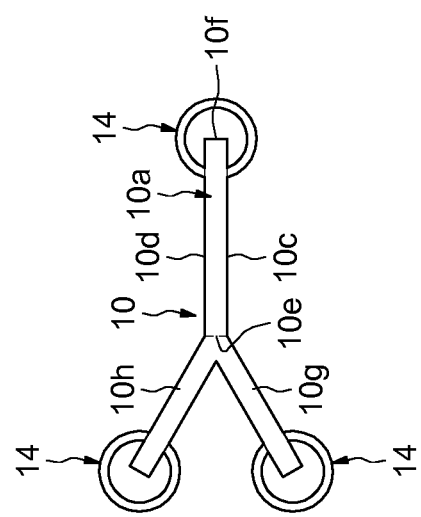
FIG. 6 is a schematic top view illustrating an intermediate element obtained during a third example of implementation of the manufacturing process.

As a variant, it is possible to manufacture blades 10 having other shapes, for example without heads 10b. In this case, it may be possible to provide a reinforcing element on each end face of the body of the blade. In another variant illustrated in FIG. 6, it is possible to provide a blade 10 comprising two arms 10g, 10h that extend from the end face 10e. A reinforcing element 14 is provided here around the free end face of each arm 10g, 10h and faces the frontal faces of said arm which are adjacent to said end face.

In the exemplary embodiment illustrated, each reinforcing element 14 has a split tubular shape of C-shaped circular cross section. Alternatively, it is possible to provide reinforcing elements 14 having a split tubular shape having a cross section that is polygonal, such as triangular, rectangular or square, as is illustrated respectively in the embodiment variants from FIGS. 7 to 9. As a variant, it is also possible to provide reinforcing elements having a split tubular shape having a cross section that is polygonal, such as hexagonal, octagonal, etc., or else reinforcing elements of elliptical cross section. A portion of the blade to be stiffened extends through the slit and into the reinforcing element 14, the other portion of the blade being located outside of said reinforcing element.

In the exemplary embodiments illustrated, the main body 10a of the blade extends substantially vertically. As a variant, the body of the blade could have a curved profile. In this case, the slit of the reinforcing element has a similar profile so as to follow the curvature of the blade.

In the exemplary embodiments illustrated in FIGS. 1 to 6, each reinforcing element extends over the entire length of the blade to be stiffened. As a variant, it is possible to provide reinforcing elements that each extend over a portion of the length of the associated blade. This may for example be the case when the blade has one zone with a thin cross section and one zone with a thick cross section. In this case, the reinforcing element may be provided only around the zone of the blade having a thin cross section.

The invention has been described on the basis of a vertical-type manufacture of blades 10, the length of each blade extending substantially vertically relative to the working surface 12a of the plate. As a variant, it is possible to make provision for a horizontal-type manufacture in which the length of the blade is substantially parallel to the manufacturing plate and perpendicular to the stacking direction. In this case, two local reinforcing elements may be provided in order to each surround longitudinal ends of the blade. The local reinforcing elements may then essentially have a role of supporting the blade when the intermediate element, which is formed by this blade and the reinforcing elements, is detached from the manufacturing plate.

The invention has been described on the basis of a laser sintering manufacture of a blade for a mould for vulcanizing tires. The invention may also be applied to another lining element of the mould intended to be added to a support block of the mould, or more generally to other types of small-sized parts used in different applications.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A process for the additive manufacturing of at least one part by powder sintering or melting using at least one beam of energy, said part comprising at least two opposite frontal faces and at least two lateral end faces, the process comprising the following steps:
  a) manufacture, by deposition and selective melting of stacked layers of powder, of at least one intermediate element comprising the part and at least one local reinforcing element having a split tubular shape that surrounds one of the lateral end faces of the part and that face each of the frontal faces of said part adjacent to said end face, a portion of the part extending through the slit of the local reinforcing element and into said reinforcing element, the other portion of the part protruding outside of the reinforcing element, said reinforcing element extending in a direction substantially parallel to the stacking direction of the layers,
  wherein during the manufacturing step, for each fused layer of powder of the part and each fused layer of powder of the local reinforcing element, the deposited powder present between each frontal face of said fused powder layer of the part and the facing end face of said fused powder layer of the reinforcing element is completely or partially fused by heat diffusion and not directly by the beam of energy, and
  b) after manufacture, gripping said other portion of the part protruding outside of the reinforcing element separation of the part and of the local reinforcing element by pulling along a direction perpendicular to the stacking direction of the layers.

2. A process according to claim 1, wherein the fused powder layers of the part and of said local reinforcing element are joined to one another during the manufacturing step.

3. A process according to claim 1, wherein said local reinforcing element is configured so as to reinforce the part at least in a direction substantially perpendicular to the stacking direction of the layers.

4. A process according to claim 1, wherein unfused powder fills a space that exists between an inner surface of said local reinforcing element and the part before the separation step.

5. A process according to claim 1, wherein according to a modelled melting of a layer of powder of the local reinforcing element and of a layer of powder of the part, a gap is provided between each end face of the layer of the reinforcing element and the frontal face of the layer of the part which is facing said end face, said gap being between 0.01 mm and 1 mm.

6. A process according to claim 1, wherein said local reinforcing element extends over the entire height of the part.

7. A process according to claim 1, wherein a plurality of intermediate elements is manufactured simultaneously at least as a matrix of columns and rows.

8. A process according to claim 7, wherein the reinforcing elements of at least one column or of at least one row are produced as one piece.

9. Intermediate element obtained by implementation of the process according to claim 1.

10. A process according to claim 1, wherein according to a modelled melting of a layer of powder of the local reinforcing element and of a layer of powder of the part, a gap is provided between each end face of the layer of the reinforcing element and the frontal face of the layer of the part which is facing said end face, said gap being less than or equal to 0.1 mm.

* * * * *